US012002165B1

(12) United States Patent
Kurz et al.

(10) Patent No.: US 12,002,165 B1
(45) Date of Patent: Jun. 4, 2024

(54) LIGHT PROBE PLACEMENT FOR DISPLAYING OBJECTS IN 3D ENVIRONMENTS ON ELECTRONIC DEVICES

(71) Applicant: Apple Inc., Cupertino, CA (US)

(72) Inventors: Daniel Kurz, Keaau, HI (US); Gowri Somanath, Santa Clara, CA (US); Tobias Holl, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/412,507

(22) Filed: Aug. 26, 2021

Related U.S. Application Data

(60) Provisional application No. 63/082,373, filed on Sep. 23, 2020.

(51) Int. Cl.
  *G06T 19/00* (2011.01)
  *G06T 15/50* (2011.01)
  *G06T 19/20* (2011.01)

(52) U.S. Cl.
  CPC .......... *G06T 19/006* (2013.01); *G06T 15/506* (2013.01); *G06T 19/20* (2013.01); *G06T 2215/16* (2013.01)

(58) Field of Classification Search
  CPC ...... G06T 15/506; G06T 19/006; G06T 19/20
  See application file for complete search history.

(56) References Cited

U.S. PATENT DOCUMENTS

| 2015/0302665 A1* | 10/2015 | Miller | G02B 27/0093 345/419 |
| 2020/0105053 A1* | 4/2020 | Prakash | G06T 15/506 |
| 2021/0166437 A1* | 6/2021 | LeGendre | G06T 19/20 |

OTHER PUBLICATIONS

Murmann et al., A Dataset of Multi-Illumination Images in the Wild, Proceedings of the IEE/CVF International conference on Computer Vision, 2019, pp. 4080-4089 (Year: 2019).*
Bowald, Global Illumination for Static and Dynamic Objects Using Light Probes, Master's Thesis in Computer Science: Algorithms, Languages, and Logic, Chalmers University of Technology, 2016 (Year: 2016).*
Marques et al., Deep Spherical Harmonics Light Probe Estimator for Mixed Reality Games, Computer & Graphics 76, 2018, pp. 96-106 (Year: 2018).*

(Continued)

*Primary Examiner* — Charles Tseng
(74) *Attorney, Agent, or Firm* — Thompson Hine LLP

(57) ABSTRACT

Various implementations disclosed herein include devices, systems, and methods that use light probes to facilitate the display of virtual objects in 3D environments. A light probe provides lighting information that describes light incident on a point in space in a 3D environment. For example, a light probe may describe such incident light using an environment map. Such lighting information can be used to provide realistic appearances for objects placed at or near light probe locations in the 3D environment. Implementations disclosed herein determine the light probe locations in real-time or other 3D environments that are generated based on a live physical environment. A digital representation of the live physical environment is used to determine where to position the light probes, how many light probes to use, and/or various light probe attributes.

24 Claims, 5 Drawing Sheets

(56) References Cited

OTHER PUBLICATIONS

Hogberg et al., Building a Pipeline for Gathering and Rendering with Spatially Variant Incident Illumination Using Real Time Video Light Probes, Linkoping University, 2007 (Year: 2007).*

Alhakamy et al., CubeMap360: Interactive Global Illumination for Augmented Reality in Dynamic Environment, 2019 SoutheastCon, Apr. 2019 (Year: 2019).*

* cited by examiner

LIGHT PROBE PLACEMENT FOR DISPLAYING OBJECTS IN 3D ENVIRONMENTS ON ELECTRONIC DEVICES

CROSS-REFERENCE TO RELATED APPLICATIONS

This application claims the benefit of U.S. Provisional Application Ser. No. 63/082,373 filed Sep. 23, 2020, which is incorporated herein in its entirety.

TECHNICAL FIELD

The present disclosure generally relates to electronic devices that provide views of three-dimensional (3D) environments, and in particular, to systems, methods, and devices for rendering views of 3D environments that include virtual objects with appearances that are based on real, physical environment lighting.

BACKGROUND

Rendering computer-generated views of virtual objects with appearances that account for lighting may provide improved user experiences. Such lighting may be used to provide virtual objects with more realistic and convincing appearances. For example, lighting may be used to provide shadows consistent with light source locations or reflections on object surfaces that are consistent with nearby physical objects. Some existing techniques for lighting virtual objects in 3D environments may be improved with respect to efficiency and/or accuracy, for example, to be better suited for real-time use and in circumstances in which a 3D environment includes representations of a live, physical environment.

SUMMARY

Various implementations disclosed herein include devices, systems, and methods that use light probes to facilitate the display of virtual objects in 3D environments. A light probe provides lighting information that describes light incident on a point in space in a 3D environment. For example, a light probe may describe such incident light using an environment map. Such lighting information can be used to provide realistic appearances for virtual objects placed at or near light probe locations in the 3D environment. The light probe locations may be determined in real-time environments based at least in part on live physical environments. The light probe locations may be based on aspects of such physical environments. For example, a digital representation of the geometry, semantics, or other attributes of a live physical environment may be input used to determine where to position the light probes, how many light probes to use, and/or various light probe attributes.

One exemplary method is performed by an electronic device executing instructions stored in a memory to perform operations. The operations include obtaining a digital representation corresponding to a physical environment. The physical environment may be a live or otherwise previously-unknown/unassessed environment. The digital representation may be based on and/or include one or more camera images (e.g., digital photographs).

The operations of the exemplary method further include, based on the digital representation, determining 3D positions in a 3D environment for a set of light probes. The set of light probes define light incident on the 3D positions in the 3D environment. The 3D positions may be determined based on environment geometry (e.g., flat surfaces, empty space, etc.), semantic understanding of physical environment (e.g., tables, chairs, walls, desks, etc.), and/or context (e.g., what the user will do, what/where virtual objects are permitted and/or are likely to be added, etc.). The 3D positions may be determined using algorithmic rules, machine learning models, and/or optimization methods. In some implementations, in addition to determining the 3D positions of the light probes, the method uses the digital representation of the physical environment to determine how many light probes to use, for example, determining a sufficiently small number of probes to approximate the lighting of an environment given available computing resource and processing constraints. As a specific example, the method may determine, based on the constraints of an electronic device and the particular use case, that only four light probes should be used and, accordingly, determine positions for the four light probes that strategically cover important portions of the environment, e.g., placing light probes more closely together in portions that include lots of structures or occlusions than in other portions of the environment. The method may also determine attributes of light probes, e.g., 3D bounding box size/shape that define where a light probe is applicable, resolution of the light probe data, bit depth of the light probe data, and/or lifespan of the light probe.

The operations of the exemplary method further include providing a view of the 3D environment based on the 3D positions determined for the set of light probes. For example, this may involve positioning a virtual object in the 3D environment and determining the appearance/lighting of the virtual object based on its position relative to at least one of the light probes. In some implementations, a virtual object that is positioned within extended reality (XR) environments is lighted (e.g., given an appropriately altered appearance, shading, shadows, etc.) to account for the lighting of the XR environment including lighting of a corresponding physical environment based on a light probe associated with the portion of the XR environment where the virtual object is positioned.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory, computer-readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
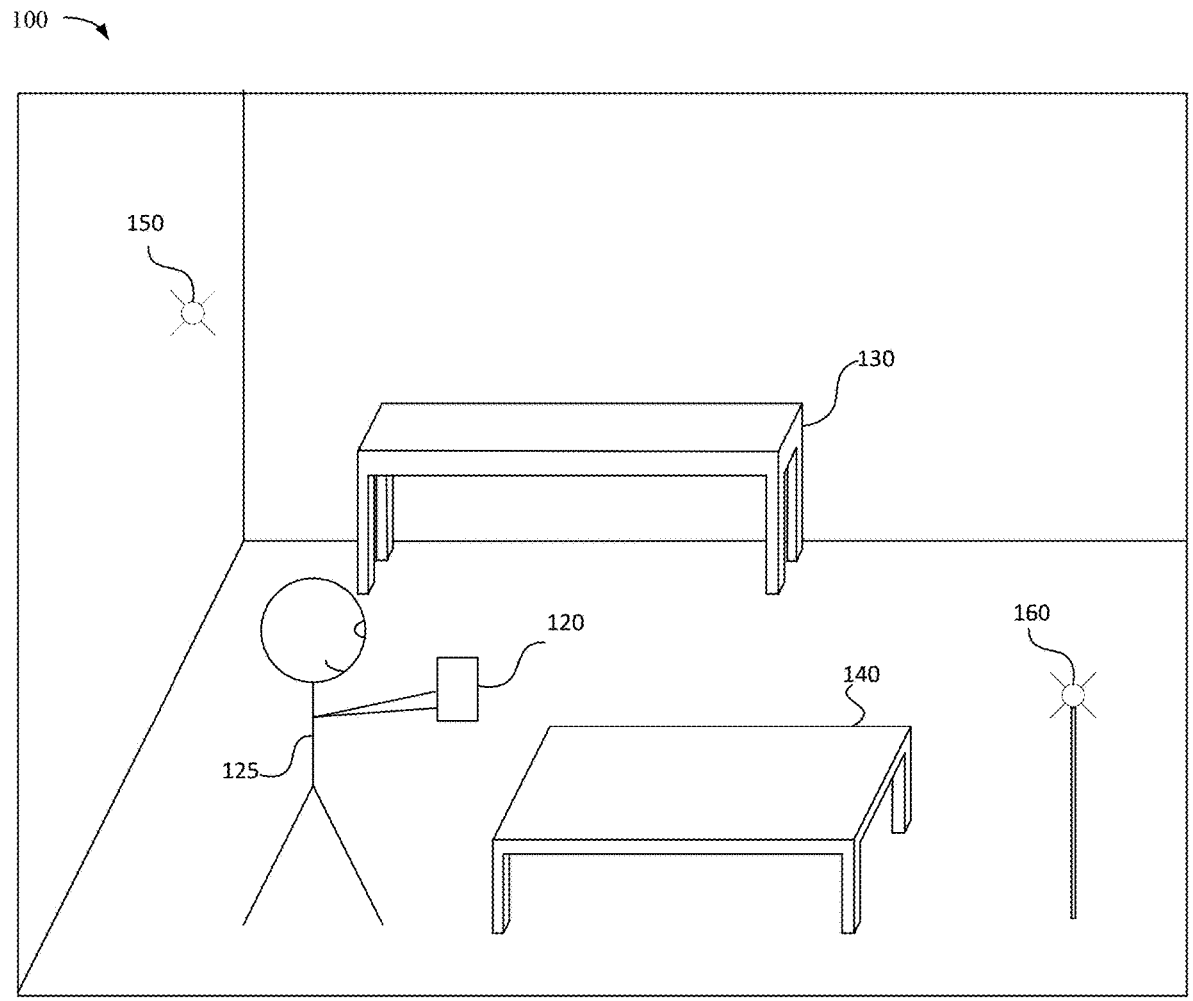
FIG. 1 is a block diagram of an example of an electronic device being used in a physical environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example physical environment 100 (e.g., a room) including a device 120. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the device 120 displays content to a user 125. For example, content may be a button, a user interface icon, a text box, a graphic, an avatar of the user or another user, and/or views of an extended reality (XR) environment that is based at least in part on the physical environment 100. In some implementations, the content can occupy the entire display area of a display of the device 120.

The device 120 obtains image data, motion data, and/or other data corresponding to the physical environment 100 via a plurality of sensors. For example, one or more image sensors on the device 120 may obtain images of the physical environment 100. In another example, one or more depth sensors on the device 120 may obtain depth data, such as depth images, of the physical environment 100.

While this example and other examples discussed herein illustrate a single device 120 in the physical environment 100, the techniques disclosed herein are applicable to multiple devices as well as to other environments. For example, the functions of device 120 may be performed by multiple devices, using the displays, sensors, or other components on each respective device, or divided among them in any combination.

In some implementations, as illustrated in FIG. 1, the device 120 is a handheld electronic device (e.g., a smartphone or a tablet). In some implementations the device 120 is a laptop computer or a desktop computer. In some implementations, the device 120 has a touchpad and, in some implementations, the device 120 has a touch-sensitive display (also known as a "touch screen" or "touch screen display"). In some implementations, the device 120 is a wearable device such as a head mounted device (HMD).

In some implementations, the device 120 has a graphical user interface (GUI), one or more processors, memory and one or more modules, programs or sets of instructions stored in the memory for performing multiple functions. In some implementations, the user 125 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors. According to some implementations, the device 120 may generate and present an extended reality (XR) environment.

Referring to FIG. 1, the physical environment 100 includes a first table 130 and a second table 140 and a first light source 150 and a second light source 160. Various implementations use light probes to facilitate the display of virtual objects in a 3D environment that is based at least in part on a physical environment such as physical environment 100. A light probe provides lighting information that describes light incident on a point in space in a 3D environment. A light probe may be used to light a virtual object (e.g., give the virtual object an appropriately altered appearance, shadows, etc.) to account for the lighting represented by a light probe. For example, a 3D environment may be generated based at least in part on the physical environment 100 and a virtual object may be positioned within that 3D environment. In this example, light probes may be determined for the 3D environment based at least in part upon the physical environment 100 and used to determine the appearance of the virtual object that is inserted into that 3D environment.

Figure 2:
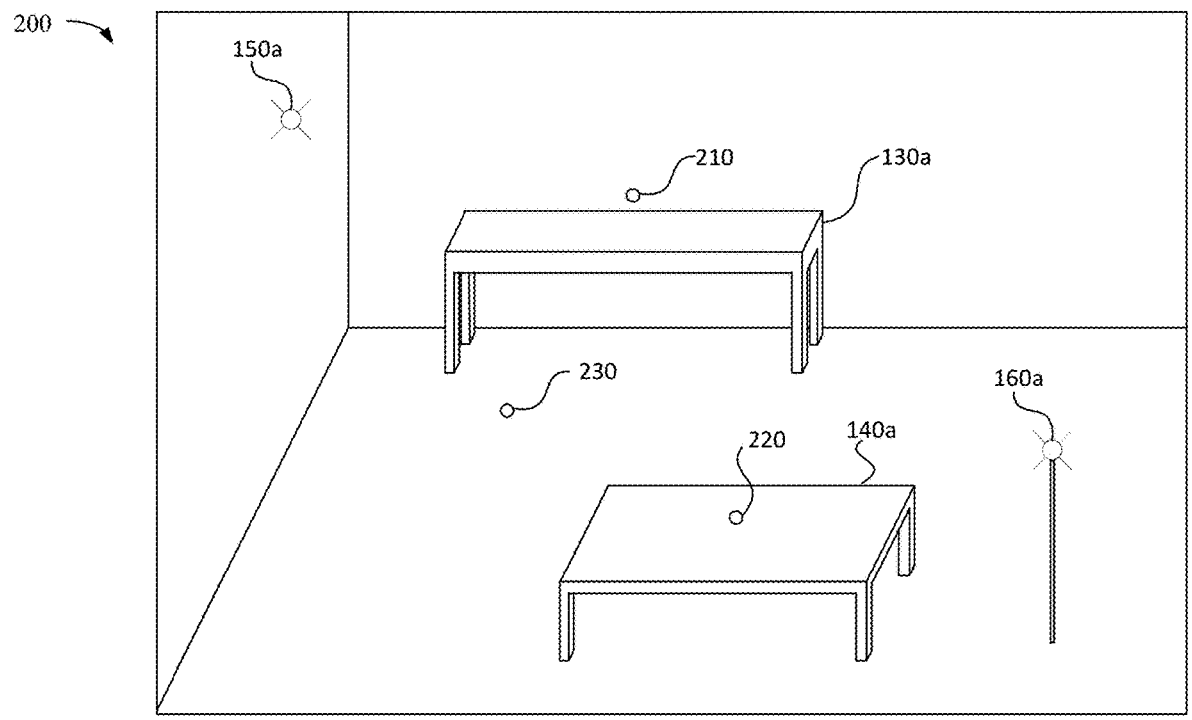
FIG. 2 illustrates light probes positioned in a 3D environment based at least in part on the physical environment of FIG. 1.

FIG. 2 illustrates light probes positioned in a 3D environment 200 based at least in part on the physical environment of FIG. 1. The 3D environment 200 includes a first table representation 130a and a second table representation 140a corresponding to the first table 130 and second table 140 of FIG. 1, respectively. The 3D environment 200 also includes a first light source representation 150a and a second light source representation 160a corresponding to the first light source 150 and second light source 160 of FIG. 1, respectively. In some implementations, a 3D environment, including 3D representations of objects of a physical environment, is generated by determining a 3D environment geometry by interpreting sensor data, e.g., image data, depth sensor data, motion data, etc.

FIG. 2 illustrates a first light probe 210 above the representation 130a of the first table 130, a second light probe 220 above the representation 140a of the second table 140, and a third light probe 230 above a floor portion of the 3D environment 200. The light probes 210, 220, 230 provide lighting information that describes light incident on respective points in space in the 3D environment 200. Since the 3D environment is based at least in part on the physical environment 100, the light probes may represent lighting information that describes light incident on certain points in space based on the lighting arrangement in the physical environment.

Figure 5:
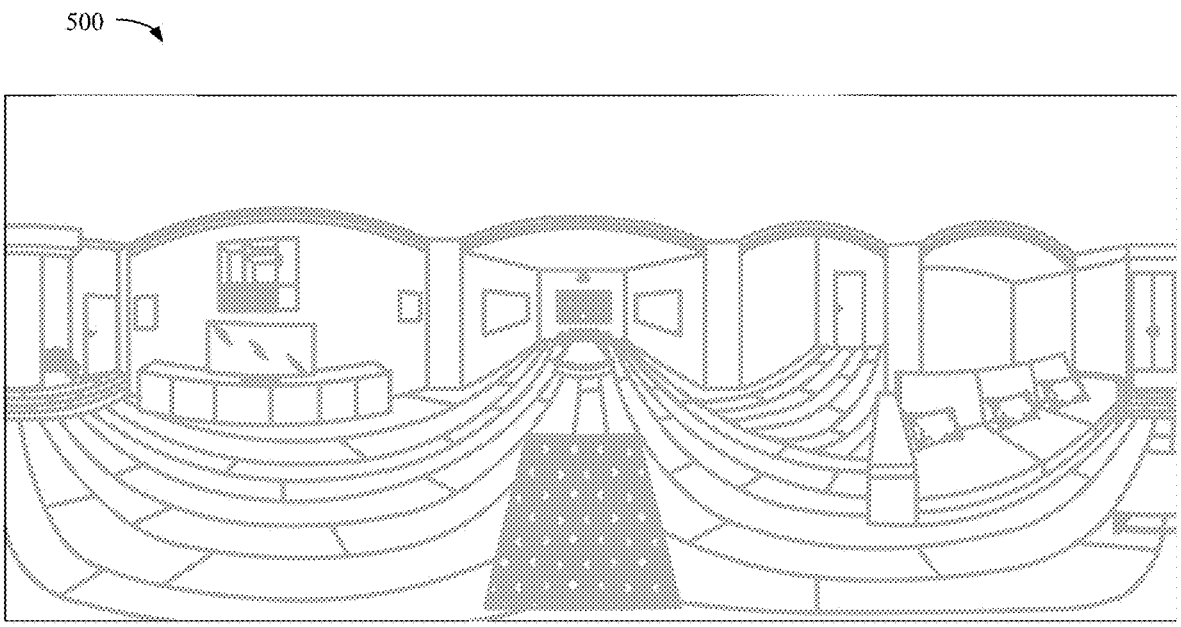
FIG. 5 illustrates exemplary light probe lighting information that includes light intensity data from all directions around a light probe position in a 3D environment.

Light probes 210, 220, 230 may be implemented in various ways. FIG. 5 illustrates exemplary lighting information of a light probe that represents light intensity data from all directions around a point in a 3D environment. The pixel values in such a map of lighting data each represent a light intensity value of light received from a given direction at the point in the 3D environment. A light probe may be defined by generating a ghost/virtual camera at the specific position of the light probe in the 3D environment 200. The ghost/virtual camera renders the geometry/texture of the 3D environment 200 from that position.

In some implementations, a light probe is implemented as a sphere mapping having a single texture containing an image of the lighting of the 3D environment 200 surrounding the point in the 3D environment at which the light probe is positioned. A light probe may be implemented as an environment map computed by re-projecting the 3D environment 200 (including its lighting) using a chosen format, e.g. using an equirectangular projection as illustrated in FIG. 5. The 3D environment 200 may be re-projected onto 6 faces of a cube, onto a sphere, or two paraboloids using a single center of projection. The re-projection may then be mapped from the given surfaces onto a 2D texture via texture mapping and represents the lighting of the 3D environment 200 for the given center of projection. For example, a cube map of the 3D environment 200 may be rendered from the position of light probe 210 by projecting 6 renderings that represent the 6 faces of a cube into an environment map. The light probe 200 may be defined by capturing and storing data that defines the surroundings 3D environment 200 from its position in the 3D environment.

As understood by one of ordinary skill in the art, other suitable projections may also be used in various implementations, e.g., paraboloid mapping, pyramid mapping, octahedron mapping, and HEALPix mapping. In other implementations, a light probe stores lighting information using functions defined on the surface of a sphere, such as in the form of the coefficients of basis functions, such as Spherical Harmonics.

As appreciated by one of ordinary skill in the art, the captured lighting of a 3D environment 200 may be mapped onto any appropriate canonical coordinate system, e.g., plane coordinates, world coordinates, geometry coordinates, etc. For example, a 360-degree (spherical) image around a point of projection may be used. Moreover, the light probe may be represented in any number of interchangeable formats, e.g., spherical representation (equirectangular projection) or cube map representation. As further understood by one of ordinary skill in the art, the choice of format may be based on the requirements of a particular developer and/or rendering engine. While light probes may be generated using various techniques, e.g., sphere mapping (also referred to as equirectangular or latitude-longitude projection/mapping), the use of cube mapping may be advantageous.

The 3D positions of the light probes 210, 220, 230 are determined based on a digital representation of the physical environment 100. Moreover, in this example, the number of light probes (i.e., three) is also determined based on the digital representation of the physical environment 100. The digital representation may be based on or include geometric primitives, such as planes, triangles, etc., and texture information for such primitives, such as, visual appearance data, semantics labels, frequency data. The digital representation may be based on and/or include volumetric representations such as signed-distance fields (SDFs) and/or analytic representations, such as identifications of detected lamps and other light sources (e.g., light sources 150, 160). The digital representation may include a floorplan, such as a 2D top-down representation of the physical environment. The digital representation may include information about the expected or actual use of the 3D environment, e.g., data corresponding to the importance of different parts of the 3D environment determined based on how frequently corresponding parts of a scene graph are queried.

The digital representation of the physical environment 100 is used to determine 3D positions in the 3D environment 200 for the light probes 210, 220, 230. The 3D positions may be determined based on geometric attributes of the physical environment 100, such as the locations of flat surfaces, occluded areas, empty spaces, etc. The 3D positions may be determined based on a semantic understanding of the physical environment 100, such as identification that a portion of a 3D geometry that correspond to one or more specific object types (e.g., table, chair, wall, desk, etc.), or such as identification of semantics of the entire physical environment (e.g. indoor vs. outdoor, natural vs. man-made, room type (kitchen, bedroom, living room, etc.)). The 3D positions may be determined based on the expected context of the 3D environment 200, such as how the user will interact in the 3D environment 200, what/where virtual objects are permitted in the 3D environment 200 and/or are likely to be added in the 3D environment 200, etc. The 3D positions may be determined using algorithmic rules, machine learning models, and/or optimization methods.

In some implementations, in addition to determining the 3D positions of the light probes, the method uses the digital representation of the physical environment to determine how many light probes to use and/or determine attributes of light probes, e.g., 3D bounding box size/shape, resolution, bit depth, and/or lifespan.

In some implementations, the 3D positions of the light probes 210, 220, 230 are determined based on the determined geometry of the physical surfaces in the 3D environment 200 based on the physical environment 100. For example, the geometry of the physical surfaces can be approximated by a set of finite, planar surfaces (e.g. quadrangles or triangles in 3D space), and the position (e.g., center of projection) of a light probe may be selected above the center of a such planar surface, along the surface normal at a distance that is half the extent of the planar surface. If the physical surfaces are approximated by more than one planar surface, implementations of this method may generate a separate light probe for each planar surface individually where the light probe location may be selected above the center of each planar surface.

The light probes 210, 220, 230 may be static, for example, in circumstances in which the reflected environment/lighting stays consistent. Alternatively, the light probes 210, 220, 230 may be dynamic where the light probe positions and/or the lighting represented by the light probes is updated to represent a dynamically changing 3D environment 200. For example, light probes may be computed at runtime for every frame or based on the occurrence of various triggers and used to provide views of the 3D environment 200 over time. Updates may be triggered at a regular cadence, triggered as a result of user motion, triggered based on proximity to the user/device, triggered as a result of detection of changes in the physical environment or 3D environment, triggered by an extension of the representation of the physical environment (e.g., as a 3D model of the physical environment is enriched as more sensor data is obtained), triggered by an expiring estimated lifespan of individual light probes, or triggered based on any other appropriate criteria.

Figure 3:
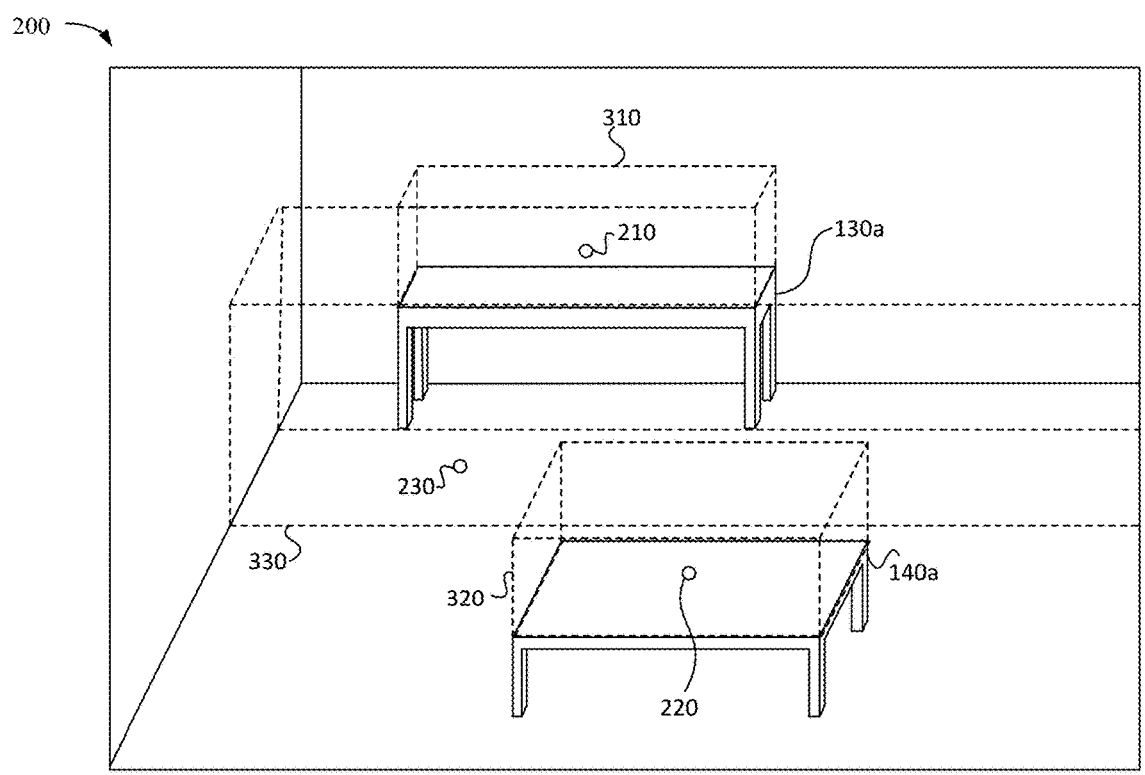
FIG. 3 illustrates the geometric boundaries of the light probes of FIG. 2.

FIG. 3 illustrates the geometric boundaries 310, 320, 330 of the light probes 210, 220, 230, respectively. A light probe may be used as a source of reflected, specular, diffuse, and ambient light for virtual objects inside its area of influence, e.g., within a defined geometric boundary/proxy geometry. Thus, in this example, light probe 210 defines the lighting to be used for lighting virtual objects positioned within geometric boundary 310, light probe 220 defines the lighting to be used for lighting virtual objects positioned within geometric boundary 320, and light probe 230 defines the lighting to be used for lighting virtual objects positioned within geometric boundary 330. Note that the light probes and geometric boundaries illustrated in FIGS. 2 and 3 are simplified to facilitate understanding. In practice, light probes and boundaries may be more or less numerous and/or may be associated with less than all or all of the space of a 3D environment 200.

The geometric boundaries 310, 320, 330 correspond to the extents of the regions of impact of the light probes 210, 220, 230. The geometric boundaries 310, 320, 330 may be determined based on the physical environment, e.g., based on the digital representation of the physical environment 100. For example, geometric boundary 310 has a lower edge that is aligned with and has the same extent as the upper planar surface (e.g., the table top) of the representation 130*a* of the first table 130. Similarly, geometric boundary 320 has a lower edge that is aligned with and has the same extent as the upper planar surface (e.g., the table top) of the representation 140*a* of the second table 140.

When using multiple light probes, each light probe has its own individual center of projection and geometric boundary/extent. The geometric boundaries may be configured to abut one another and occupy some or all of the space of the 3D environment 200. In some implementations, light probes are positioned and their geometric boundaries are determined by determining a minimal optimal set of light probes and associated geometric boundaries (e.g. 3D boxes) required to occupy a portion or all of the available space. In some implementations, the boundaries of two or more light probes overlap and the virtual objects located in the overlapping area may be lighted using a combination of multiple light probes.

The light probes 210, 220, 230 provide lighting information that can be used to provide realistic appearances for virtual objects placed at or near light probe locations in the 3D environment 200. The 3D environment 200 may be a real-time environment that is based at least in part on a live physical environment. The light probe locations may be based on aspects of such a physical environment. For example, a digital representation of the geometry, semantics, or other attributes of a live physical environment may be input used to determine where to position the light probes, how many light probes to use, and/or various light probe attributes.

Figure 4:
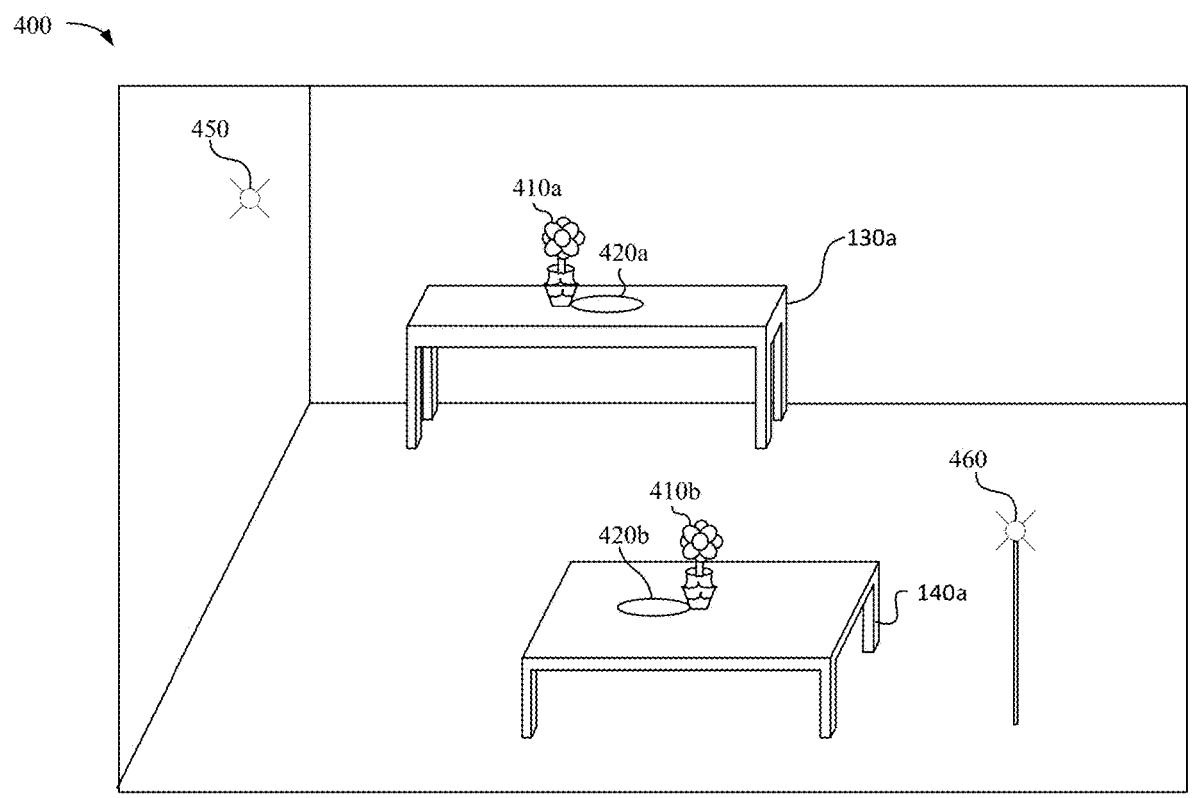
FIG. 4 illustrates providing virtual objects in the 3D environment of FIGS. 2 and 3 based on the light probes.

FIG. 4 illustrates providing virtual objects in the 3D environment of FIGS. 2 and 3 based on two of the light probes 210, 220. In this example, the first virtual vase 410*a* is positioned on the representation 130*a* of the first table 130 and the second virtual vase 410*b* is positioned on the representation 140*a* of the second table 140. Based on its position (e.g., within the geometric boundary 310 (FIG. 3)), the first light probe 210 is used to provide the appearance of the first virtual vase 410*a*. For example, given the proximity and position of the first light source representation 450 (and thus the corresponding light source 150), the left side of the first virtual vase 410*a* may be more illuminated/brighter than the right side of the first virtual vase 410*a*. Similarly, given the relative proximity and position of the first light source representation 450 (and thus the corresponding light source 150), virtual shadow 420*a* may be displayed on the right side of the first virtual vase 410*a*.

In contrast, based on its position (e.g., within the geometric boundary 320 (FIG. 3)), the second light probe 220 is used to provide the appearance of the second virtual vase 410*b*. For example, given the proximity and position of the second light source representation 460 (and thus the corresponding light source 160), the right side of the second virtual vase 410*b* may be more illuminated than the left side of the second virtual vase 410*b*. Similarly, given the relative proximity and position of the second light source representation 460 (and thus the corresponding light source 160), virtual shadow 420*b* may be displayed on the left side of the second virtual vase 410*b*.

Figure 6:
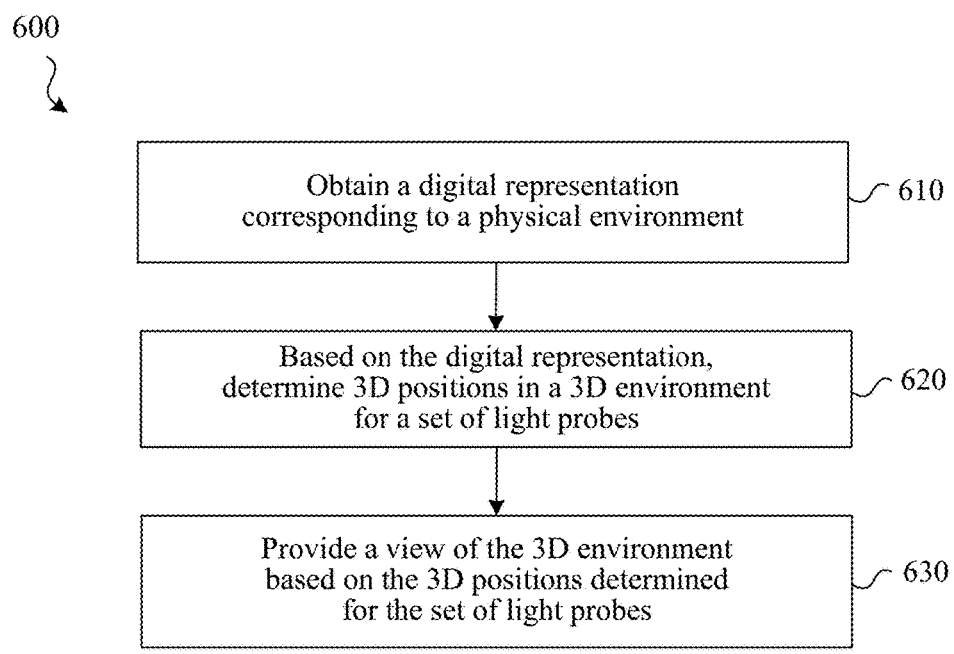
FIG. 6 is a flowchart representation of a method of providing a view of a 3D environment based on 3D positions determined for the set of light probes in accordance with some implementations.

FIG. 6 is a flowchart representation of a method of providing a view of a 3D environment based on 3D positions determined for the set of light probes. In some implementations, the method 600 is performed by a device 120, such as a mobile device, desktop, laptop, HMD, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 obtains a digital representation corresponding to a physical environment. The physical environment may be a live or otherwise previously-unknown/unassessed environment, such as physical environment 100 discussed herein with respect to FIG. 1. The digital representation of the physical environment, e.g., 3D environment 200 discussed herein with respect to FIG. 2, may include one or more of: one or more camera images (e.g., digital photos or videos) with or without known poses between them, one or more depth maps with or without known relative poses between them, one or more 2D or 3D geometric primitives, such as planes or triangles, texture information for the geometric primitives, e.g., visual appearance, semantic labels, frequency data, volumetric representation of environment geometry, e.g., represented via a signed distance function/field, analytic representation of environment geometry, e.g., locations and attributes of point, directional, and/or area light sources, a 2D floor plan, and/or the importance of different portions of the physical environment determined, for example, based on how frequently corresponding portions of a scene graph were queried and thus more likely to be portions that are important with respect to accurate lighting.

At block 620, the method 600, based on the digital representation, determines 3D positions in a 3D environment for a set of light probes, e.g., light probes 210, 220, and 230 discussed herein with respect to FIGS. 2 and 3. The 3D positions may be determined based on environment geometry (e.g., flat surfaces, empty space, etc.), semantic understanding of physical environment (e.g., identifying tables, chairs, walls, desks, etc.), and/or context (e.g., identifying what the user will do, what/where virtual objects are permitted and/or are likely to be added, etc.). Determining the 3D positions may involve determining centers of projection to use for obtaining data for each of the light probes. Determining the 3D positions may be further based on an already-defined light probe, e.g., a user-defined light probe, which may be immutable. Accordingly, the 3D positions may be determined based on an existing immutable light probe that will be complemented by one or more additional light probes positioned at the 3D positions.

The method 600 may determine the geometric boundaries (e.g., 3D bounding boxes) of light probes that define the extent of space in the 3D environment for which each light probe is applicable. The geometric boundaries of the light probes, for example, may be determined to correspond to nearby table tops, floor portions, or other surfaces. The geometric boundaries of light probes may be based on semantic understanding of objects in the physical environment. For example, an object that is a desk may be more likely to have virtual object placed upon it than other types of objects and thus may be a relatively more important portion of the environment with respect to accurate lighting than the other portions. A light probe may be positioned above the desk and assigned a geometric boundary corresponding to the exact desk dimensions to ensure that virtual object placed on the desk will have desirable lighting. Example geometric boundaries include geometric boundaries 310, 320, and 330 discussed herein with respect to FIG. 3.

The method 600 may determine type and/or resolution (e.g., angular, cube map face, equirectangular, etc.) to use for the light probes based on the digital representation. For example, if one portion of an environment has a significantly greater amount of detail than other portions, a higher resolution may be used for the light probes positioned proximate that portion of the environment. Lower resolution representations (which may require fewer computing and time resources) may be used for light probes positioned proximate the other, less-detailed portions of the environment.

The method 600 may determine bit depth (e.g., 8 bit per color channel, 16 bit per color channel, etc.) to use for the light probes based on the digital representation. For example, if one portion of an environment has high contrast (e.g., high dynamic range (HDR)), a higher bit rate may be used for the light probes positioned proximate that portion of the environment. Lower bit rate representations (which may require fewer computing and time resources) may be used for light probes positioned proximate the other portions of the environment having less contrast.

The method 600 may determine expected life for the light probes based on the digital representation. For example, certain portions of an environment may be more likely to change than other portions and light probes positioned proximate such portions may be assigned relatively shorter life spans.

In some implementations, in addition to determining the 3D positions of the light probes, the method uses the digital representation of the physical environment to determine how many light probes to use, for example, determining a sufficiently small number of probes to approximate the lighting of an environment given computing resource and constraints. As a specific example, the method may determine, based on the constraints of an electronic device and the use case, that only four light probes should be used and, accordingly, determine positions for the four light probes that maximize coverage of important portions of the environment, e.g., placing light probes more closely together in portions that include lots of structures or occlusions than in other portions of the environment.

The 3D positions, geometric boundaries, and attributes of light probes may be determined using algorithmic rules, machine learning models, and/or optimization methods. For example, a machine learning model such as a neural network may input a digital representation and output a set of light probes, e.g., positions, geometric boundaries, etc. Such a machine learning model may be trained using a supervised learning technique such as stochastic gradient descent and backpropagation, for example, using manual annotations, based on user study data, e.g., identifying where users spend the most time and/or are likely to place virtual objects with respect to various example physical environments.

A machine learning model may be trained using reinforcement learning using a reward. The reward may be based on: the number of light probes, the distance between light probe geometry surfaces and known surfaces of the physical environment given determined positions and geometric boundaries of light probes, the volume in the physical environment that does not intersect with any light probe, the loss of spatial frequencies of physical environment texture given determined resolution of the light probes, and/or the loss of dynamic range in the physical environment texture given determined bit depth of the light probes, as examples. The reward may be the inverse of any of the terms of a cost function for an optimization-based approach as described below. In one example, this involves rewarding machine learning predictions based on a final set of light probe positions. The reward may be based on an objective assessment of the final set of light probe positions, e.g., rewarding greater coverage area and penalizing greater use of light probes and/or more expensive light probe attributes.

A machine learning model may be trained using a teacher/student learning approach or a model distillation approach, supervised by a more intensive/expensive method, e.g., an optimization-based approach. In some implementations, a machine learning model is trained using a (private) federated learning approach. The federated learning may be supervised by a more intensive/expensive method (e.g., an optimization approach).

In some implementations, 3D positions, geometric boundaries, and/or attributes of light probes are determined using an optimization-based approach. For example, such an optimization may minimize a cost function, and it may be, for example, Gradient Descent, non-linear optimization, Gauss-Newton algorithm, Levenberg Marquardt algorithm, Linear programming, particle swarm optimization, or combinatorial optimization. The terms of a cost function may include: the number of light probes, the distance between light probe geometry surfaces and known surfaces of the physical environment given determined positions and geometric boundaries of light probes, the volume in the physical environment that does not intersect with any light probe, the loss of spatial frequencies of physical environment texture given determined resolution of the light probes, the loss of dynamic range in the physical environment texture given determined bit depth of the light probes, and/or one or more of the above weighted according to the determined importance of different portions of the physical environment, as examples.

In some implementations, 3D positions, geometric boundaries, and/or attributes of light probes are determined using heuristics/rule-based methods. For example, a general geometric approach may determine 3D positions of light probes by evenly distributing the light probes around where a user is currently positioned in the environment. In another example, 3D positions of light probes may be evenly distributed around the user's current position and within a threshold distance, e.g., within range of the user device's depth sensors, where virtual object placement is more likely. For example, a fixed number of light probes (e.g., 5) may be uniformly positioned around the user's current position. The light probes may be prioritized to be positioned and/or within a threshold distance outside of the user's field of view (FOV).

In a general semantic approach, semantic information is derived for a 3D mesh representing the environment and light probes are positioned above surfaces of particular types of objects. For example, light probes may be positioned based on prioritizing tables over chairs, floors over walls and ceilings, etc. In some implementations, a combined semantic and general approach positions light probes based on identifying nearby objects of particular types, e.g., tables within 2 meters. In other rule-based implementations, light probes are placed based additionally or alternatively based upon semantic information regarding lights, e.g., placing light probes where light changes spatially, for example, relative to windows and other light sources. This may involve, for example, placing relatively more light probes there were there are more spatial light changes.

In certain applications, additional parameters may be utilized in determining 3D positions, geometric boundaries, and/or attributes of light probes. For example, a digital representation of virtual aspects of the 3D environment (e.g., virtual portions of an XR environment) may be used. For example, light probes may be positioned and configured based on the application type of the application that the user is using to experience an 3D environment. For example, a game that requires the user to move around a lot may result in more distributed light probe positions than a media consumption application designed to be used while the user is sitting still.

As another example, light probes may be positioned and configured based on an interaction mode that the user is using to experience the 3D environment. For example, one interaction mode may enable a user to place virtual objects on vertical surfaces while another interaction mode may only allow placement of virtual objects on tables, while yet another may enable placement of floating virtual objects in the air. The light probe positions and/or configurations may account for these different interaction modes, for example, by positioning relatively more light probes at and near areas where virtual object are permitted to be positioned and fewer or no light probes in areas where virtual objects are prohibited or unlikely to be positioned.

Light probes may additionally or alternatively be positioned and configured based on attributes of the virtual objects that can be or are positioned within the 3D environment. For example, light probe position and/or configuration may be based on the pose, shape, and/or materials of such virtual objects. In one example, based on information that a shiny object is positioned at a particular position within a 3D environment, one or more light probes may be positioned nearby with a relatively high resolution to ensure accurate display of the shiny object and/or other objects positioned nearby.

The various inputs, parameters, and factors described herein can be used in various ways to implement a system that positions and configures light sources. For example, the various attributes may be used as input in any combination to a machine learning model. In another example, such attributes may be used to weight a cost function for optimization-based determination methods. In another example, such attributes may be used directly in heuristics-based methods.

Another aspect of some implementations involves updating light probe positions and configurations over time. This may involve reevaluating current light probe time periodically or based on other threshold criteria being satisfied. Light probes may be updated globally. A global update, for example, may be triggered at a regular cadence, triggered as a result of user motion, triggered as a result of detection of changes in the physical environment or 3D environment, triggered by an extension of the representation of the physical environment (e.g., as a 3D model of the physical environment is enriched as more sensor data is obtained), or triggered based on any other appropriate criteria. Light probe updates may be locally implemented. Local updates may be implemented based on proximity to the user, triggered by an expiring estimated lifespan of individual light probes, or based on any other appropriate criteria.

Light probe updates may involve any of the determinations (e.g., machine learning-based, rule-based, optimization-based) described herein. Moreover, such determinations may additionally account for a prior set of light probes. For example, a machine learning model may be trained with an additional loss on the difference between the previous light probes and the current/new light probes. An optimization-based approach may use an additional cost for changes between previous and current/new light probes. Accounting for previous light probes can encourage temporal consistency, reducing noticeable changes that might otherwise occur due to light probe transitions.

Returning to FIG. 6, at block 630, the method 600 provides a view of the 3D environment based on the 3D positions determined for the set of light probes. For example, this may involve positioning a virtual object in the 3D environment and lighting the virtual object based on its position relative to one of the light probes. Light probe positions/attributes can be used to determine how to display a virtual object positioned in between light probes.

Light probe positions/attributes can be used to simulate parallax or other realistic appearances. A typical environment map be used to store information for a light probe that includes incident light from a range of directions but may not have information on how far the emitting or reflecting surfaces are away from the light probe position. Therefore, when using the light probe to render a virtual object, an assumption may be made that all incident light in the light probe is located at infinite distance. This may lead to unrealistic appearance of the virtual object, in particular when the actual distance to these surfaces is small, which becomes particularly visible when rendering reflections of the physical environment on the virtual object. If a light probe has an extent, e.g. a 3D bounding box, then that extent can be used as an approximation for the geometry of the physical surfaces around the light probe, and using the distance of the extent (e.g. bounding box) instead of an infinite distance during rendering, thereby simulating parallax, may result in a more realistic visual appearance of the virtual object.

In some implementations, providing the view of the 3D environment involves providing a view of an XR environment, for example, a view that includes a virtual object positioned amongst real and virtual objects and/or real and/or virtual light sources.

In contrast to a physical environment, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 7:
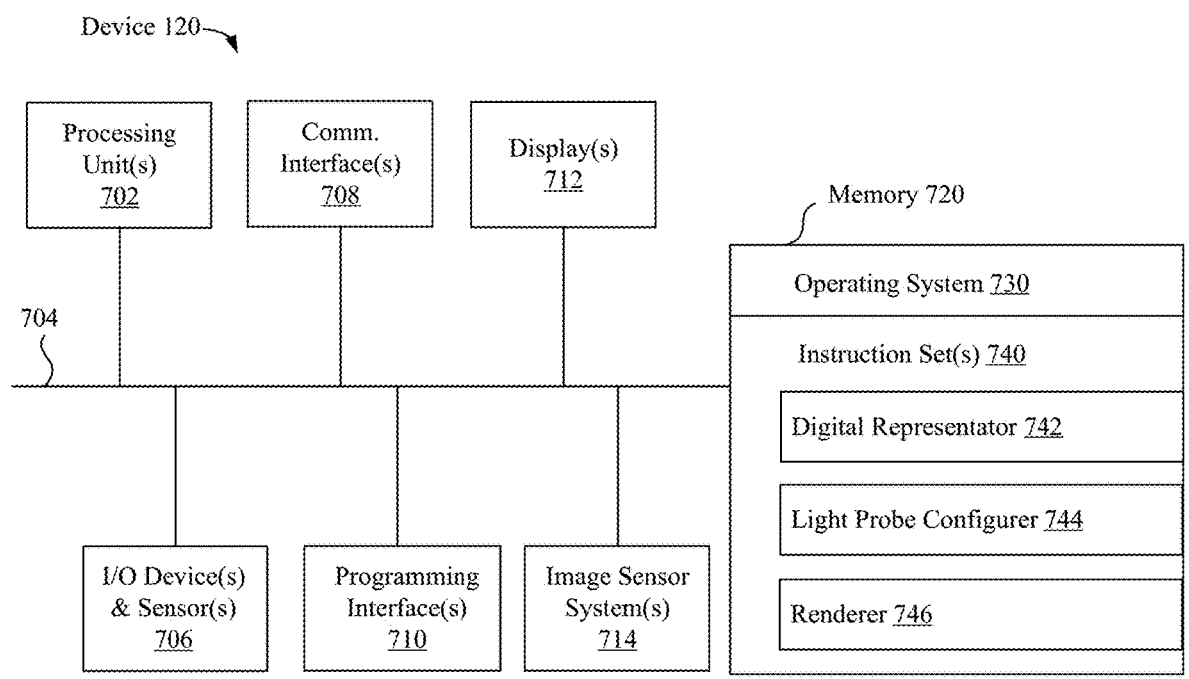
FIG. 7 is a block diagram illustrating exemplary components of a device configured in accordance with some implementations.

FIG. 7 is a block diagram illustrating exemplary components of the device 120 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment (e.g. a 3D environment) to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 712 correspond to diffractive, reflective, polarized, holographic, etc. waveguide displays. In one example, the device 120 includes a single display. In another example, the device 120 includes a display for each eye of the user.

In some implementations, the one or more image sensor systems 714 are configured to obtain image data that corresponds to at least a portion of the physical environment 100. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 502 to carry out one or more of the techniques described herein.

The instruction set(s) 740 include a digital representor 742, a light probe configurer 744, and a renderer 746. The instruction set(s) 740 may be embodied a single software executable or multiple software executables.

In some implementations, the digital representor 742 is executable by the processing unit(s) 702 to generate a digital representation of a physical environment, for example, using data obtained from image sensor system(s) 714. To these ends, in various implementations, it includes instructions and/or logic therefor, and heuristics and metadata therefor.

In some implementations, the light probe configurer 744 is executable by the processing unit(s) 702 to position and/or configure a set of one or more light probes based on a digital representation of a physical environment provided by the digital representor 742 using one or more of the techniques discussed herein or as otherwise may be appropriate. To these ends, in various implementations, it includes instructions and/or logic therefor, and heuristics and metadata therefor.

In some implementations, the renderer 746 is executable by the processing unit(s) 702 to generate and display one or more views of a 3D environment including a 3D environment that includes real or virtual objects whose appearance is determined based on the set of light probes configured by the light probe configure 744. To these ends, in various implementations, it includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first surface could be termed a second surface, and, similarly, a second surface could be termed a first surface, without changing the meaning of the description, so long as all occurrences of the "first surface" are renamed consistently and all occurrences of the "second surface" are renamed consistently. The first surface and the second surface are both surfaces, but they are not the same surface.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a processor:
determining characteristics of a physical environment based on sensor data obtained in the physical environment, wherein the characteristics of the physical environment comprise a semantic understanding or an expected context;
generating a digital representation representing the characteristics of the physical environment;
based on characteristics of the digital representation, determining three-dimensional (3D) positions in a 3D environment for a set of virtual light probes, the set of virtual light probes defining light incident on the 3D positions in the 3D environment based on virtual cameras at the 3D positions; and
providing a view of the 3D environment based on the 3D positions determined for the set of virtual light probes.

2. The method of claim 1, wherein the 3D positions are determined based on a rule that accounts for a geometry, semantics, or a lighting condition of the physical environment.

3. The method of claim 1, wherein the 3D positions are determined using a machine learning model.

4. The method of claim 1, wherein the 3D positions are determined based on an optimization that optimizes a number of virtual light probes or probe-to-surface distances.

5. The method of claim 1, wherein determining the 3D positions comprises determining a number of virtual light probes to include in the set of virtual light probes based on the digital representation.

6. The method of claim 1, wherein determining the 3D positions is based on an existing immutable light probe.

7. The method of claim 1 further comprising determining, based on the digital representation, 3D bounding box sizes or shapes, resolutions, bit depths, or lifespans of the set of virtual light probes.

8. The method of claim 1, wherein the digital representation is based on a camera image of the physical environment.

9. The method of claim 1, wherein the digital representation comprises:
   geometric primitives of the physical environment;
   a volumetric representation of the physical environment;
   semantics labels of objects of the physical environment;
   representations of light sources of the physical environment; or
   a two-dimensional (2D) floorplan of the physical environment.

10. The method of claim 1, wherein the 3D positions are determined based on expected usage of the 3D environment.

11. The method of claim 1, wherein providing the view of the 3D environment comprises:
    positioning a virtual object in the 3D environment; and
    lighting the virtual object based on a position of the virtual object relative to one or more of the set of virtual light probes.

12. The method of claim 1, wherein providing the view of the 3D environment comprises simulating parallax based on the 3D positions of the set of virtual light probes.

13. The method of claim 1, wherein the 3D positions of the set of virtual light probes are determined based on an application type associated with the 3D environment.

14. The method of claim 1, wherein the 3D positions of the set of virtual light probes are determined based on an interaction mode between the physical environment and the 3D environment.

15. The method of claim 1, wherein the 3D positions of the set of virtual light probes are determined based on pose, shape, or material of one or more virtual objects expected to utilize the set of virtual light probes.

16. The method of claim 1, further comprising, based on additional information about the physical environment, updating the 3D positions for the set of virtual light probes.

17. The method of claim 16, wherein the updating is triggered:
    at a regular cadence;
    based on user motion;
    based on user distance from one or more of the set of virtual light probes;
    based on a change in the physical environment; or
    based on a change of the digital representation.

18. The method of claim 16, wherein the 3D positions of less than all the set of virtual light probes are updated.

19. The method of claim 16, wherein the updating is based on previous 3D positions of the set of virtual light probes.

20. The method of claim 1, wherein the characteristics of the physical environment are geometric attributes.

21. The method of claim 1, wherein the characteristics of the physical environment comprise the semantic understanding.

22. The method of claim 1, wherein the characteristics of the physical environment comprise the expected context.

23. A system comprising:
    a device with one or more processors; and
    a memory including instructions that, when executed by the one or more processors, cause the system to:
    determine characteristics of a physical environment based on sensor data obtained in the physical environment, wherein the characteristics of the physical environment comprise geometric attributes corresponding to fixed portions or empty spaces of the physical environment;
    generate a digital representation representing the characteristics of the physical environment;
    based on characteristics of the digital representation, determine three-dimensional (3D) positions in a 3D environment for a set of virtual light probes, the set of virtual light probes defining light incident on the 3D positions in the 3D environment based on virtual cameras at the 3D positions; and
    provide a view of the 3D environment based on the 3D positions determined for the set of virtual light probes.

24. A non-transitory computer-readable medium storing program instructions executable via one or more processors to perform operations comprising:
    determining characteristics of a physical environment based on sensor data obtained in the physical environment, wherein the characteristics of the physical environment comprise a semantic understanding or an expected context;
    generating a digital representation representing the characteristics of the physical environment;
    based on characteristics of the digital representation, determining three-dimensional (3D) positions in a 3D environment for a set of virtual light probes, the set of virtual light probes defining light incident on the 3D positions in the 3D environment based on virtual cameras at the 3D positions; and
    providing a view of the 3D environment based on the 3D positions determined for the set of virtual light probes.

* * * * *